May 1, 1956

H. G. WILKIN 2,743,717

LAPIDARY SAWS

Filed March 30, 1954

INVENTOR.
HAROLD G. WILKIN
BY
ATTORNEY

May 1, 1956 H. G. WILKIN 2,743,717
LAPIDARY SAWS
Filed March 30, 1954 2 Sheets-Sheet 2
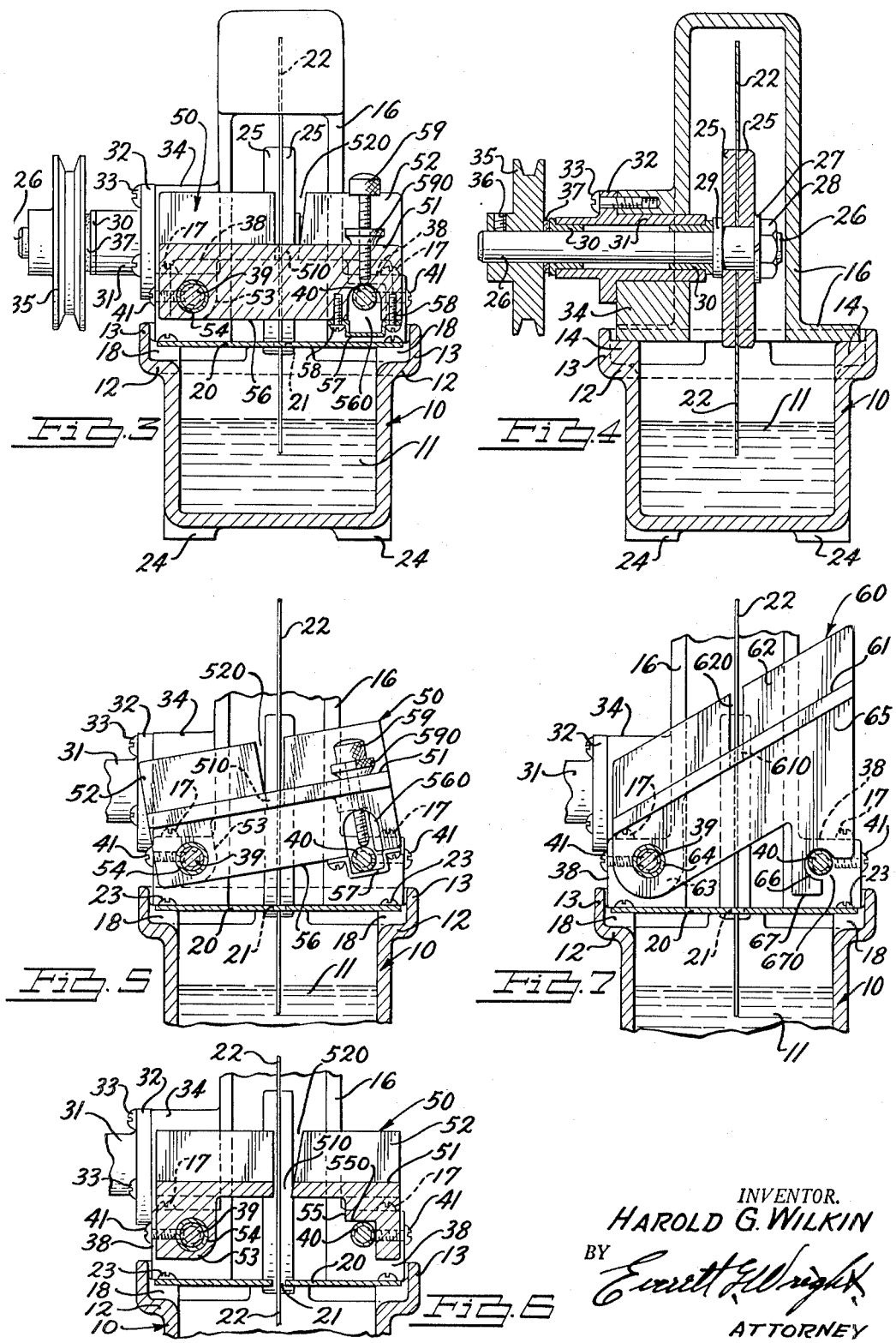
INVENTOR.
HAROLD G. WILKIN
BY
ATTORNEY

United States Patent Office 2,743,717
Patented May 1, 1956

2,743,717

LAPIDARY SAWS

Harold G. Wilkin, Ferndale, Mich.

Application March 30, 1954, Serial No. 419,790

6 Claims. (Cl. 125—13)

This invention relates to improvements in power saws particularly adaptable for use by lapidaries in the cutting of precious and semi-precious stones.

Lapidary saws are generally composed of a rapidly rotating circular saw or cutting blade and a table upon which a stone to be cut is held, which table is manually advanced to bring the work or stone into cutting relationship with respect to the saw. The saw or cutting blade is usually partially immersed during use into water or a cutting and/or coolant compound which also serves to clean the blade during the high speed rotation thereof.

The primary object of this invention is to provide a lapidary saw having a rotating saw or other cutting element, a coolant reservoir and a sliding work supporting table which is adaptable to support stones for cutting on minutely variable angles or on any of a number of selected angles, the said lapidary saw utilizing a variable angle sliding work supporting table and various replacement sliding work supporting tables disposed at specific selected angles with respect to the rotating saw or cutting element.

Another object of the invention is to provide a lapidary saw having a slidable work supporting table minutely adjustable to present stones to the cutting element for cutting on the desired angle, which work supporting table is readily replaceable by other work supporting tables each presenting stones for cutting on a specific selected angle.

Another object of the invention is to provide a lapidary saw having a work table supported in non-binding relationship on a pair of ways, the said work table being guidably slidable on one way and slidably supported on the other.

Another object of the invention is to provide an inexpensive readily manufactured lapidary saw having a non-binding work table slidably supported on a pair of ways, the said work table being telescopingly guided at spaced areas on one of said ways.

A further object of the invention is to provide a lapidary saw having a non-binding work table telescopingly supported and guided on a pair of spaced bearings on one way and slidably supported in adjustable relationship on the other way whereby the work table may be tilted on minutely variable angles to accomplish cutting on the desired angle.

A further object of the invention is to provide a lapidary saw having a rotating saw and a non-binding work table movable on a pair of ways into and out of the path of the rotating saw telescopingly supported and guided on one way presenting the work table at a specific angle in respect to the saw replaceable by like work tables telescopingly supported and guided on said one way and slidably supported on said other way at other specific angles in respect to said saw.

A still further object of the invention is to provide a simple, economical to manufacture and extremely versatile lapidary saw readily disassembled for cleaning and having work table means to accomplish minutely variable and specific angular sawing of precious or semi-precious stones preparatory to the grinding and/or polishing thereof.

Other objects of the invention will become apparent by reference to the following detailed description taken in connection with the accompanying drawings, in which:

Fig. 3 is a vertical sectional view taken on the line 3—3 of Fig. 2 showing the angularly adjustable non-binding slidable work table disposed in its normal position.

Fig. 4 is a vertical sectional view taken on the line 4—4 of Fig. 2.

Fig. 5 is a vertical sectional view similar to Fig. 3 showing the work table adjustably supported in its maximum angle of tilt.

Fig. 6 is a fragmentary vertical sectional view taken on the line 6—6 of Fig. 2.

Fig. 7 is a fragmentary vertical sectional view showing one of a plurality of fixed angle tables readily replaceable by like work tables having work supporting surfaces disposed on other fixed angles in respect to the rotatable saw, each of said tables being supportable in telescoped and guided relationship on one way and in slidable relationship on the other.

Figure 1:
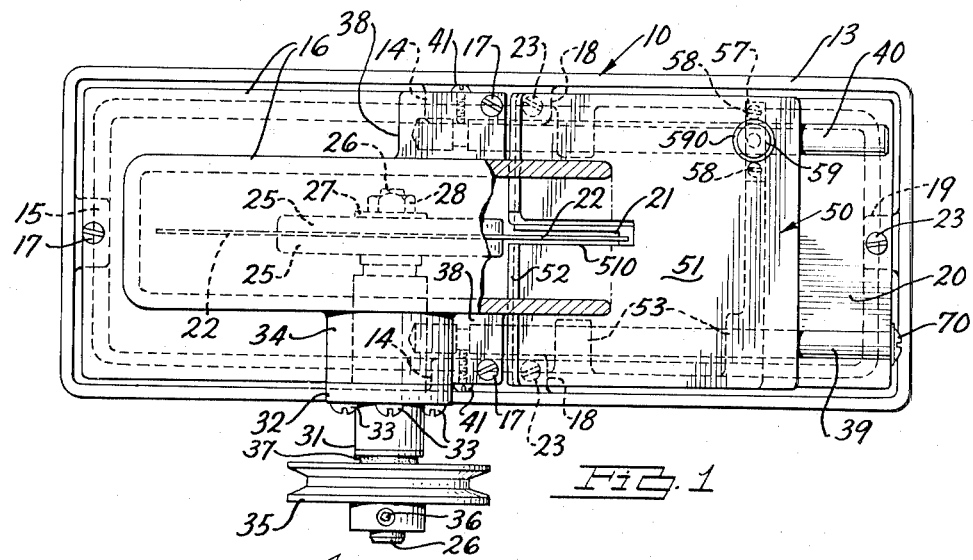
Fig. 1 is a plan view of a lapidary saw embodying the invention, certain parts being broken away to show the sliding work support in its fully advanced position.

Referring now to the drawings wherein like figures refer to like and corresponding parts throughout the several views, the particular construction disclosed for the purpose of illustrating the invention comprises a base or tank 10 adapted to receive water or other fluid 11, which base is preferably provided with a horizontal shoulder 12 therearound and a vertical peripheral lip 13. On the shoulder 12 and within the peripheral lip 13 are formed pads 14 at opposite sides and a pad 15 at the rear of the base 10 onto which is seated a saw housing 16 having a guard element integral therewith.

The saw housing 16 is removably secured onto the pads 14 and 15 by suitable studs 17. Also, on the shoulder 12 and within the peripheral lip 13 are pads 18 disposed adjacent to but lower than the pads 14 and a pad 19 at the front of the base 10 onto which is secured a tank cover or splash plate 20 having a slot 21 therein to provide clearance for the rotating saw or cutting element 22. The splash plate 20 is removably secured to the pads 18 and 19 by suitable studs 23. The base 10 is preferably provided with a plurality of supporting feet 24 which may be bored and threaded to permit the lapidary saw to be mounted on the same panel or table (not shown) onto which a motor (not shown) employed to drive the saw may be mounted.

The circular saw or cutting element 22 may be in the form of a thin cutting disc having its periphery impregnated with diamond bort, and is disposed between mounting discs 25 which are telescoped onto the rotatable saw shaft 26 and are secured thereon by means of a lock washer 27 and nut 28 threaded on the outer end of the said shaft 26 to clamp the said mounting discs 25 with the saw element 22 therebetween against an annular shoulder 29 formed on the saw shaft 26, all as best shown in Fig. 4. The shaft 26 is journaled on suitable bearings 30 disposed in a shaft mounting sleeve 31 having a flange 32 which is secured by studs 33 to the face of a boss 34 formed on one side of the saw housing 16, which boss 34 is bored to accommodate the shaft mounting sleeve 31. A V-belt pulley 35 is keyed on the shaft 26 by such means as an Allen head screw 36 with a suitable thrust washer 37 disposed between the end face of the bearing 30 and the pulley 35. This construction not only provides a rugged well aligned vibration free drive for the saw or cutting element 22 but permits the saw or cutting element 22 to be changed readily.

A boss 38 is formed on each side of the saw housing 16, and each boss 38 is bored longitudinally from its front end face to receive and support a cylindrical way 39 and 40 respectively, which ways are anchored in their respective bores by means of set screws 41. Thus, the ways 39 and 40 are supported in horizontally spaced cantilever relationship forwardly from said saw housing 16 ready to receive and support thereon manually slidable work tables as hereinafter described in detail.

Figure 2:
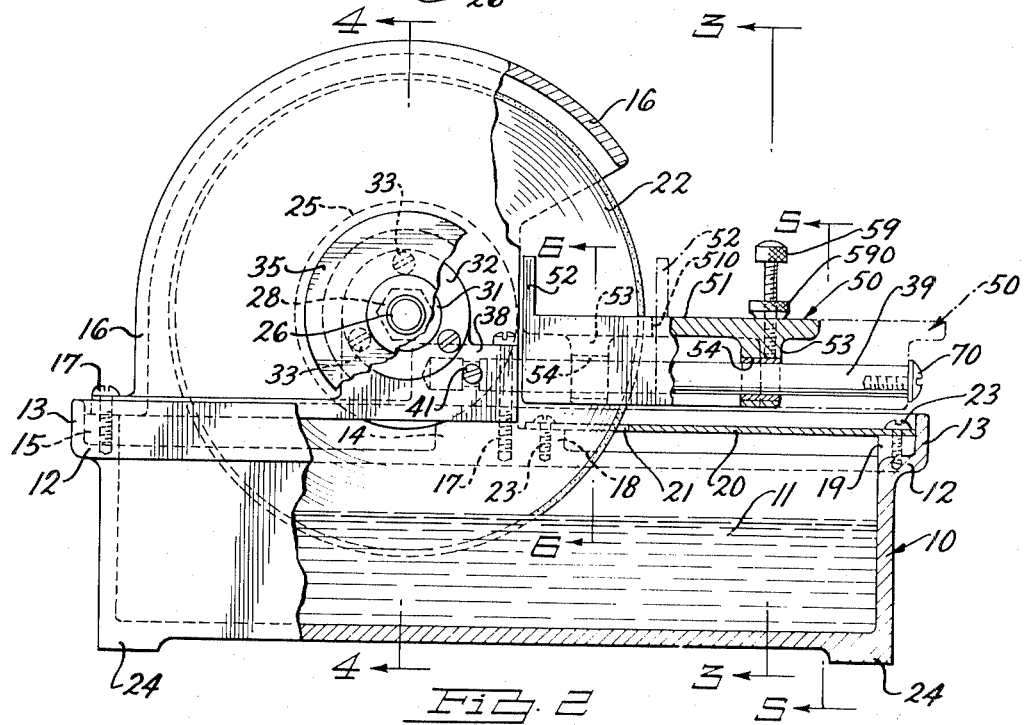
Fig. 2 is a side elevational view with portions broken away to more clearly show details of construction.

The work table 50 disclosed in Figs. 1–6 inclusive comprises a bed 51 providing a work supporting surface and a back 52 providing a work abutment. The bed 51 is provided with two longitudinally spaced depending lugs 53 preferably on its left side as viewed from the front of the lapidary saw, which lugs 53 are bored and bushed with bushings 54 to permit slidable mounting on the left side of the work table 50 on the cylindrical way 39 as best shown in Figs. 2, 3, 5 and 6. On the right side of the bed 51 is an inverted L-shaped lug 55 having a horizontal portion 550 for supporting the right side of the work table 50 on the way 40 when the said work table 50 is disposed in its horizontal position as shown in Fig. 6.

Across the front of the work table 50 is an apron 56 extending laterally from the foremost lug 53, which apron is slotted and arched at 560 to accommodate the cylindrical way 40. The work table 50 is not only slidable on the way 39 but is tiltable about the longitudinal axis thereof as best shown in Fig. 5. To accommodate the saw or cutting element 22, the bed 51 and back 52 of the work table 50 are slotted at 510 and 520 respectively. The slots 510 and 520 are more or less V-shaped as best shown in Figs. 3, 5 and 6 to permit the work table 50 to be tilted about the way 39 without coming in contact with the saw or cutting element 22. A stirrup 57 bridging over the bottom of the arched slot 560 is secured by studs 58 to the bottom of the apron 56 of the work table 50, and is of such dimension as to limit the tilting of the work table 50 about the way 39 to the maximum angle of tilt permitted by the V-shaped slots 510 and 520 with operating clearance for the rotating saw or cutting element 22.

To minutely regulate the tilting of the work table 50, a tilt screw 59 is threaded through the table 50 preferably at the center of the arched slot 560 in the apron 56, and a suitable lock nut 590 is provided on the tilt screw 59 which is threaded thereon into contact with the work supporting surface or bed 51 of the work table 50 to fix the adjustment of the tilt screw 59. The lower end of the tilt screw 59 is preferably rounded or otherwise formed to permit it to slide freely upon the way 40.

Whenever a stone is to be cut, it is positioned on the work table 50 and held firmly against the work supporting surface 51 and the work abutment 52 with the portion to be cut disposed in alignment with the rotating saw or cutting element 22. The cutting element 22 is driven by a suitable high speed motor and V-belt, not shown, connected to the driven V-belt pulley 35 keyed on the saw shaft 26. The shape of stones before rough-cutting them is ofttimes such that it is impossible to hold the stone on the work table 50 at the desired angle to accomplish the cut necessary to present the best design or pattern within the stone for subsequent polishing. If such is the case, the work table 50 may be tilted to the desired angle by the tilt screw 59 and fixed in such tilted position by the lock nut 590.

Because of the fact that the work table 50 is telescopingly mounted on only one cylindrical way 39 and is slidably supported on the other way 40, exact parallelism of the ways 39 and 40 is not required, and it is impossible to bind the work supporting table when it is manually and minutely advanced toward the rotating saw or cutting element 22 during the cutting of a stone manually held onto the work supporting surface 51 and against the work abutment 52.

When it is desired to cut stones on various fixed angles, for example 15, 22½, 30, 37½ or 45 degrees, work tables such as the work table 60 are employed, each having a bed 61 disposed on a fixed angle with respect to the ways 39 and 40 providing an angularly disposed work supporting surface and each having a back 62 providing a work abutment. The bed 61 is provided with two longitudinally spaced depending lugs 63 preferably on its left side as viewed in Fig. 7, which lugs 63 are bored and bushed with bushings 64 to permit slidable mounting of the left side of the work table 60 on the way 39 as best shown in Fig. 7. Across the front of the work table 60 is an apron 65 having a bore 66 in the depending ear 67 thereof, which bore is somewhat larger in diameter than the diameter of the cylindrical way 40. The lower right hand corner of the depending ear 67 of the apron 65 may be cut out as indicated at 670 if desired. The bore 66 is so located that there is only substantially a spot contact between the apron 65 and the way 40 as it is supported in sliding relationship on the top thereof. The bore 66 is also so located in respect to the way 39 and the bed 61 of the work table 60 that the bed 61 is on a fixed angle with respect to the ways 39 and 40, for example 15, 22½, 30, 37½ or 45 degrees. To accommodate the saw or cutting element 22, the bed 61 and back 62 of the work table 60 are slotted at 610 and 620 respectively on an angle normal to the ways 39 and 40.

The work table 60 may be substituted by like and similar work tables each having its work supporting surface 61 disposed at a different angular disposition of its work spect to the ways 39 and 40. The work table 60, and other like and similar work tables that may be substituted therefor having different angular disposition of its work supporting surface provide means for cutting stones held thereon at different selected angles, while the work table 50 provides means for cutting stones on minutely variable angles, thus incorporating complete flexibility of use in a simple, readily manufactured and inexpensive lapidary saw having nonbinding sliding work table construction.

To prevent accidental removal of a work table from the way 39 and yet readily permit the changing of work tables, a cap screw 70 having a head slightly larger in diameter than the diameter of the way 39 is threaded into the outer end thereof.

Although but a single embodiment of the invention has been shown and described, it is obvious that many changes may be made in the size, shape, arrangement and detail of the various elements without departing from the spirit and scope thereof as defined by the appended claims.

I claim:

1. A lapidary saw comprising a base having a coolant reservoir therein, a rotary saw element removably mounted on said base with the saw blade thereof depending in said reservoir, a pair of ways extending in cantilever relationship from said saw element, a saw table slidably and telescopingly mounted at spaced areas on one way and slidaly mounted at one area on top of said other way, said saw table including a bed and an upwardly disposed work abutment slotted to accommodate the saw blade when said table with work manually held thereon is manually slidably advanced and tilted into angular cutting relationships in respect to said saw blade.

2. A lapidary saw comprising a base having a coolant reservoir therein, a rotary saw element removably mounted on said base with the saw blade thereof depending in said reservoir, a pair of ways extending in cantilever relationship from said saw element, a saw table, spaced means tiltably and slidably telescoping said saw table on one of said ways and single means slidably mounting said saw table on the other of said ways, said saw table including a bed and an upwardly disposed work abutment slotted to accommodate the saw blade when said table is tilted and slidably advanced to present work held thereon in cutting relationship in respect to said saw blade, the said single means slidably mounting said saw table on said other way including means for tilting said saw table about said first mentioned way.

3. In a lapidary saw, a saw element including a rotatable saw blade, a pair of ways, a saw table including an upwardly disposed work resting abutment slidably and tiltably telescoped on one way and slidably supported on top of the other way, said saw table having a V-slot therein accommodating said saw blade when said table is slidably advanced and manually tilted in angular relationship to present work held thereon at selected angles into cutting relationship with said saw blade.

4. In a lapidary saw, a saw element including a rotatable saw blade, a pair of ways cantilevered from said saw element, a saw table including an upwardly disposed work resting abutment and two spaced supports telescoped in slidable relationship on one way and a single support slidably resting on the other way, said saw table having a V-slot therein accommodating said saw blade when said table and work thereon is tilted at a selected angle and advanced into cutting relationship with said saw blade, the said single support including means for tilting said saw table to the desired angle in respect to said rotatable saw blade.

5. In a lapidary saw, a saw element including a rotatable saw blade, a pair of ways cantilevered from said saw element, a saw table including an upwardly disposed work resting abutment and two spaced supports telescoped in slidable relationship on one way and a single support slidably resting on the other way, said saw table having a V-slot therein accommodating said saw blade when said table and work thereon is tilted at a selected angle and advanced into cutting relationship with said saw blade, means at said single support for tilting said saw table to the desired angle in respect to said saw blade, and means limiting the tilt of said saw table within the angles permitted by the V-slot therein.

6. In a lapidary saw, a saw element including a rotatable saw blade, a pair of ways cantilevered from said saw element, a saw table including an upwardly disposed work resting abutment and two spaced supports telescoped in slidable relationship on one way and a single support slidably resting on top of the other way, said single support cooperating with said spaced supports to support said saw table on a predetermined fixed angle with respect to said saw blade, said saw table having a slot therein accommodating said saw blade when said saw table and work thereon is advanced into cutting relationship with said saw blade, said single support including means for preventing any material tilting of said work table about said spaced supports, said saw table being replaceable on said ways by like saw tables haivng their single supports adapted to support them at different predetermined angles with respect to said saw blade.

References Cited in the file of this patent
UNITED STATES PATENTS

| | | |
|---|---|---|
| 1,026,321 | La Hodny | May 14, 1912 |
| 2,444,598 | Eyles et al. | July 6, 1948 |
| 2,491,047 | Hunt et al. | Dec. 13, 1949 |
| 2,557,251 | Baker et al. | June 19, 1951 |